United States Patent [19]
Klein, Jr.

[11] Patent Number: 5,486,324
[45] Date of Patent: Jan. 23, 1996

[54] METHOD OF MAKING TIGHT RADIUS PLASTIC CORNER COMPONENTS FOR STATIC STRUCTURES

[76] Inventor: Frederick H. Klein, Jr., P.O. Box 411, Oley, Pa. 19547

[21] Appl. No.: 254,824

[22] Filed: Jun. 6, 1994

[51] Int. Cl.$^6$ ................................................. B29C 53/04
[52] U.S. Cl. ........................................ 264/138; 264/295
[58] Field of Search .................................. 264/138, 293, 264/295, 339

[56] References Cited

U.S. PATENT DOCUMENTS 4,701,232  10/1987  Werres ................................ 264/295 X

FOREIGN PATENT DOCUMENTS 2242387  10/1991  United Kingdom ................... 264/295

*Primary Examiner*—Leo B. Tentoni
*Attorney, Agent, or Firm*—Caesar, Rivise, Bernstein, Cohen & Pokotilow, Ltd.

[57] ABSTRACT

A corner component and a method of providing the same for securement to a static structure to provide a decorative surface, e.g., a counter-top, or stall shower. The corner component is comprised of a thermoplastic material selected from the group consisting of filled acrylics, filled polyesters, and filled acrylic-polyester blends and is formed from an integral member of thermoplastic material. The corner component comprises a first generally planar section, a second generally planar section, and a curved intermediate section having a radius of curvature of no greater than 1 inch. Each of the first and second sections is of a predetermined thickness of at least ¼ inch. The intermediate section is of a thickness that is substantially less than the predetermined thickness of the first and second sections such that the first and second sections can be bent with respect to each other by the application of heat to the intermediate section. The curved intermediate section is formed without the thermoplastic material of the corner being damaged.

12 Claims, 4 Drawing Sheets

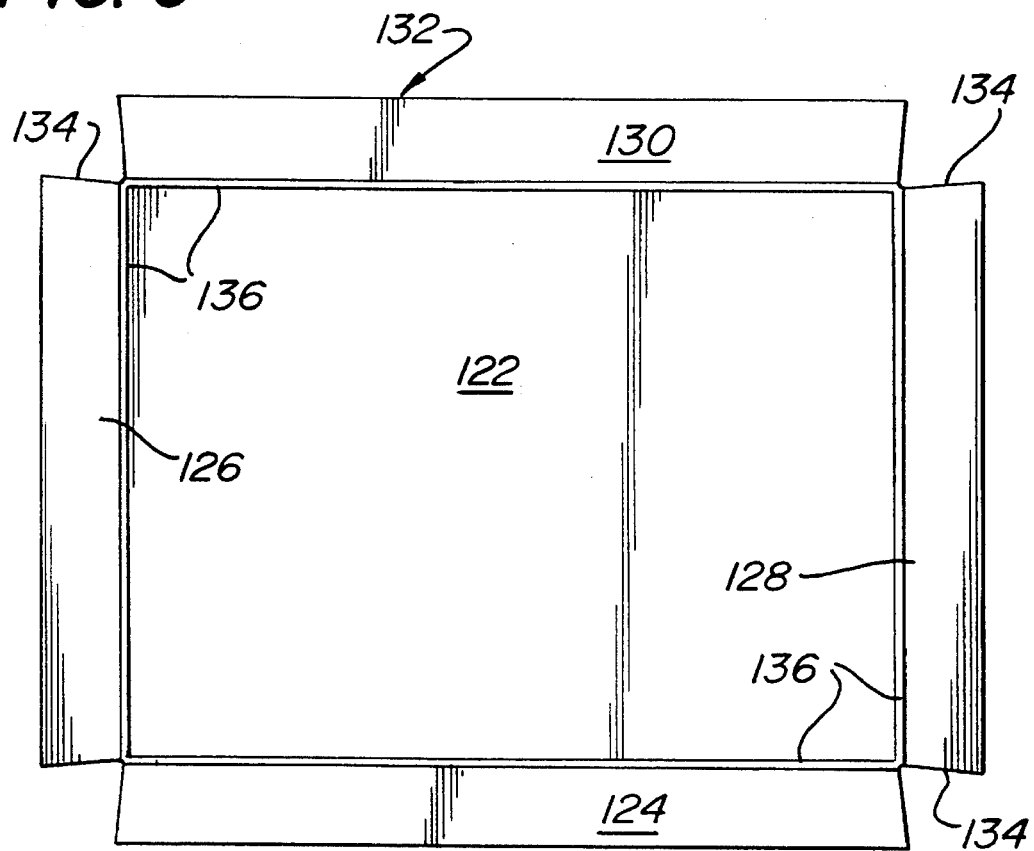
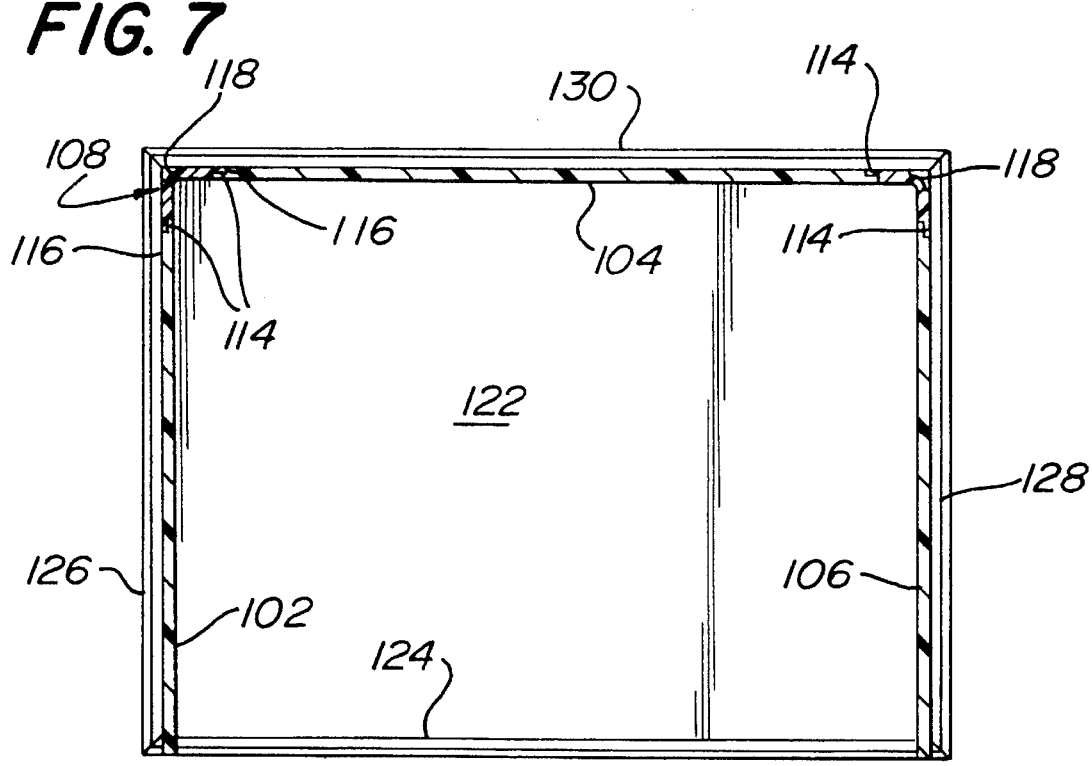

METHOD OF MAKING TIGHT RADIUS PLASTIC CORNER COMPONENTS FOR STATIC STRUCTURES

BACKGROUND OF THE INVENTION

This invention relates generally to plastic components and more particularly to plastic corner components for static structures and methods of making such components.

Today, a variety of different thermoplastic materials simulating naturally occurring materials such as marble, stone, wood, etc. are utilized in the interior of homes, offices and other buildings for counters, shower stalls and the like. The thermoplastic materials used in these applications are selected from the group consisting of filled acrylics, filled polyesters and filled acrylic-polyester blends. These materials are sold under various trademarks, such as the Registered Trademark CORIAN of E. I. DuPont de Nemours Company, the trademark GIBRALTER of Wilson Art Company, the Registered Trademark FOUNTAINHEAD BY NEVAMAR of the Nevamar Corporation, the trademark CERELL of the Formica Corporation, and the Registered Trademark AVONITE of the Avonite Corporation.

The aforementioned filled thermoplastic materials are manufactured in square sheets varying in thickness. The square sheets can be fabricated in any thickness from 4 mm up, however, they are typically available in ¼ inch, ⅜ inch, ½ inch and ¾ inch thicknesses.

Many of the filled thermoplastic materials possess functional and cosmetic properties which make their use desirable in kitchen and bathroom applications such as kitchen counter-tops, bathroom vanities, shower stalls and other components having corners.

For example, the aforementioned filled thermoplastic materials are presently used to fabricate counter-top features such as a backsplash and/or a front drip edge. Each of these features forms a corner on an existing counter-top surface in order to contain splashed water and protect surrounding walls and cabinets. These materials are also used to fabricate shower floor pans. Such floor pans are typically designed with cornered side walls for containing water. Similarly, filled thermoplastic materials have been used to fabricate corner sections of the shower stalls. These corner sections join the shower walls together.

Presently, a corner component, such as a backsplash or a front drip edge, is fabricated of filled thermoplastic materials by adhesively joining a strip of such material to a counter-top made of the same material. Similarly, the corner components contained in shower floor pans and corner sections are often fabricated by joining together two pieces of the filled thermoplastic material.

The fabrication and assembly of such corner pieces thus requires considerable time, effort and expense. For example, to form a backsplash or a front drip edge, at least two pieces of material must be cut from a flat sheet of filled thermoplastic material—one piece for the counter-top deck and another piece for the backsplash and/or front drip edge. Once placed in position, the backsplash piece or front drip edge forms a right-angle corner with the counter-top deck. Next, clamping tools and braces are attached to orient and hold in place the counter-top deck and the backsplash piece or front drip edge while adhesive is applied and allowed to dry.

Similarly, in forming shower wall corner sections and floor pans which are utilized in the construction of shower stalls, the present method of fabrication utilizes plural components which must be secured together using adhesive. Prior art methods of forming shower stall corner sections and shower floor pans do not make use of a bent corner of unitary or one-piece construction.

While the foregoing prior art corner components and methods of forming same may achieve their intended structural purpose, these corner components and methods for making the same nevertheless leave much to be desired from various standpoints. In this regard the process of securing together, e.g., gluing, the multiple components to form the corner is labor intensive, requires special techniques, and is time consuming. Moreover, corner sections comprised of plural adhesively secured components may be prone to leakage where the two or more pieces are joined together if the joint is not a good one. Perhaps, most importantly, is the fact that a corner section fabricated from plural components is not as aesthetically pleasing as one of a unitary, i.e., one-piece, construction since the later type of corner does not include any seam line.

For some applications filled thermoplastic materials can be formed into integral corner members by a method known as thermoforming. This method entails heating and bending the material into the corner. For example, a technical bulletin published by E. I. DuPont de Nemours Company entitled "Thermoforming Sheets Of CORIAN®" describes this method. In thermoforming, a sheet of thermoplastic material is cut to finished dimensions and heated in a typical convection oven to a temperature between 275° F. and 325° F. Heat up times vary depending on the heater design and the size of the piece to be formed. The heated thermoplastic sheets are thereafter mechanically formed or bent into desired shapes and allowed to cool.

When bending a heated sheet of filled thermoplastic material, a minimum bend radius must be maintained. This minimum bend is usually recommended by the manufacturer. For example, in its technical bulletin DuPont recommends that for a ¼ inch CORIAN® sheet a bend radius of no less than 1 inch must be maintained. Similarly, for ½ inch CORIAN® a bend radius of no less than 3 inches must be maintained and for ¾ inch CORIAN®, a bend radius of no less than 5 inches must be maintained. Bending thermoplastic sheets to a radius smaller than the recommended value can result in whitening, crazing, cracking, or reduced impact resistance. As can be appreciated from the foregoing technical information, under this method of thermoforming, a smaller bend radius can be achieved by using thinner thermoplastic sheets. Conversely, when thermoforming thicker stock, a larger bend radius must be maintained to avoid the aforementioned problems. The present process of thermoforming requires exposure to temperatures where discoloration may take place due to exposure to heat over an extended period of time. By utilizing thinner stock thermoplastic sheets, pliability is achieved in a lesser period of time thus reducing the possibility of discoloration.

In many applications, such as the construction of counter-tops, shower stall corner sections, and shower pans, for both cosmetic and functional reasons it is desirable to form corners that have a bend radius which is much smaller than that recommended by the manufacturer for given material thicknesses. Therefore, the foregoing prior art method of thermoforming is unavailable, and the only way to fabricate such corner sections heretofore has been by joining separate components together, as described above, with all of the attendant disadvantages.

For example, in fabricating counter-tops with backsplash and front drip edge features, it is desirable to use a thermoplastic sheet which is ½ inch in thickness to assure proper impact resistance and shock absorption. In forming a backsplash or front drip edge from thermoplastic material of sufficient thickness, for cosmetic reasons it is desirable to achieve a tight radius bend, such as no greater than ⅜ inch. The tightest bend radius which is recommended under present thermoforming methods for ⅜ inch thick CORIAN® material is somewhere between 1 inch and 3 inch.

Therefore, under present methods, thermoforming is unavailable for fabricating these features in a counter-top because one cannot achieve a suitably tight bend radius in thermoplastic materials of thickness necessary for counter-top fabrication.

For similar reasons, the prior art method of thermoforming is unavailable for bending thermoplastic sheets to form sidewalls of shower pans. To assure a snug fit between the shower pan sidewalls and shower walls which are inserted therein, it is necessary that the sidewalls be bent at a tight bend radius no greater than ⅜ inch radius. This is not possible under the present method of thermoforming where shower pans must be comprised of thermoplastic material ½ inch in thickness or greater for weight bearing ability.

Similarly, the prior art method of thermoforming is unavailable for creating shower stall corner sections. Typically, shower stall corner sections are at least ½ inch in thickness. To assure a proper fit with shower walls it is desirable to form the right-angle corner sections by bending a flat thermoplastic sheet to a radius of no more than ⅜ inch. Since manufacturers recommend that ½ inch thick thermoplastic sheet be bent no less than a 3 inches radius, the prior art method of thermoforming is inappropriate for forming shower stall corner sections.

Therefore, in the previously mentioned applications and in other applications, there is a need for corner components of one piece construction that have a tight bend radius and for methods of making the same.

OBJECTS OF THE INVENTION

Accordingly, it is a general object of this invention to provide filled thermoplastic corner components and methods of making the same which overcome the disadvantages of the prior art.

It is another object of this invention to provide filled thermoplastic corner components which are of one-piece construction and therefore are more aesthetically pleasing than the prior art.

It is another object of this invention to provide filled thermoplastic corner components and methods of making the same which are less labor intensive, time consuming and complicated.

It is another object of this invention to provide filled thermoplastic corner components and methods of making the same which are less expensive.

SUMMARY OF THE INVENTION

These and other objects of this invention are achieved by providing a component formed of a filled thermoplastic material selected from the group consisting of filled acrylics, filled polyesters, and filled acrylic-polyester blends, for fixed securement to the interior of a static structure to provide a decorative surface. The component, e.g., a counter-top, table-top, a corner section for a stall shower or the sidewall of a shower pan, has at least one corner and is formed from an integral member of the thermoplastic material.

The corner comprises a first generally planar section, a second generally planar section, and a curved intermediate section having a radius of curvature of less than approximately 1 inch (2.54 cm), each of said first and second sections being of a predetermined thickness of at least approximately ¼ inch (0.64 cm). The intermediate section is of a thickness that is substantially less than the predetermined thickness of the first and second sections, such that the first and second sections can be bent with respect to each other by the application of heat to said intermediate section. The curved intermediate section is formed without the thermoplastic material of the corner cracking.

In accordance with the method aspect of the invention, the component is formed by first providing a generally planar panel that is comprised of a thermoplastic material selected from the group consisting of filled acrylics, filled polyesters, and filled acrylic-polyester blends. The panel is of a predetermined thickness of at least approximately ¼ inch (0.64 cm) having an inner and outer surface. The panel includes a recess in one of its surfaces extending along a first line, whereupon the thickness of the panel along the first line is Substantially less than the thickness of contiguous portions of the panel. The recess can be formed by mechanically removing (e.g., routing) material from the panel, or by molding the panel to include the recess therein.

The panel is heated along the first line, and thereafter bent along the first line to form a corner thereat with a radius of curvature of less than approximately 1 inch.

DESCRIPTION OF THE DRAWINGS

Other objects and many attendant features of this invention will become readily appreciated as the same becomes better understood by reference to the following detailed description when considered in connection with the accompanying drawings wherein:

FIG. 6 is a top view of a blank of material constructed in accordance with this invention for forming the stall shower pan.

FIG. 7 is an enlarged sectional view taken along lines 7—7 of FIG. 6.

DETAILED DESCRIPTION OF THE PREFERRED EMBODIMENTS

Figure 1:
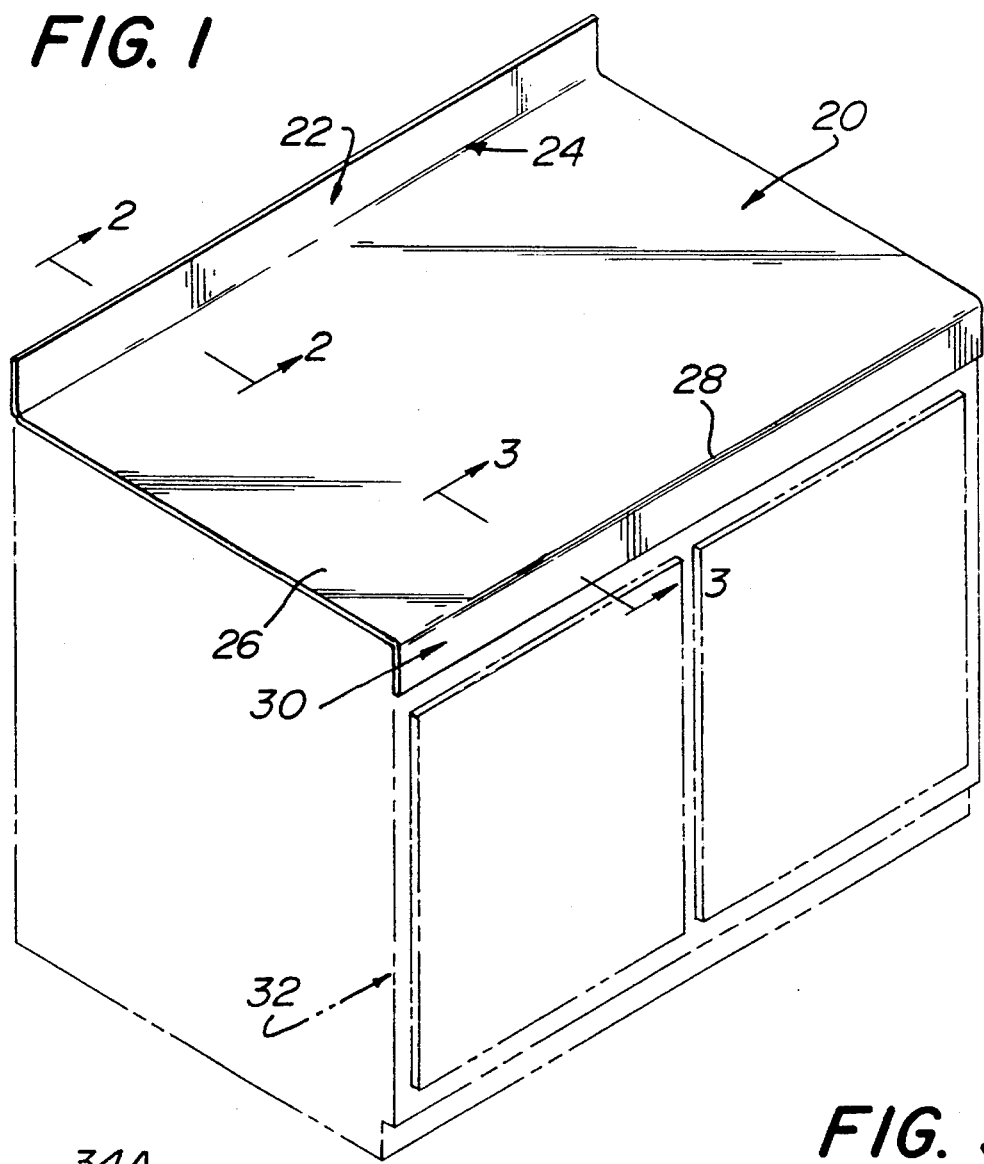
FIG. 1 is an isometric view of a counter-top constructed in accordance with this invention shown mounted on a conventional cabinet (the cabinet is shown by phantom lines)
Figure 2:
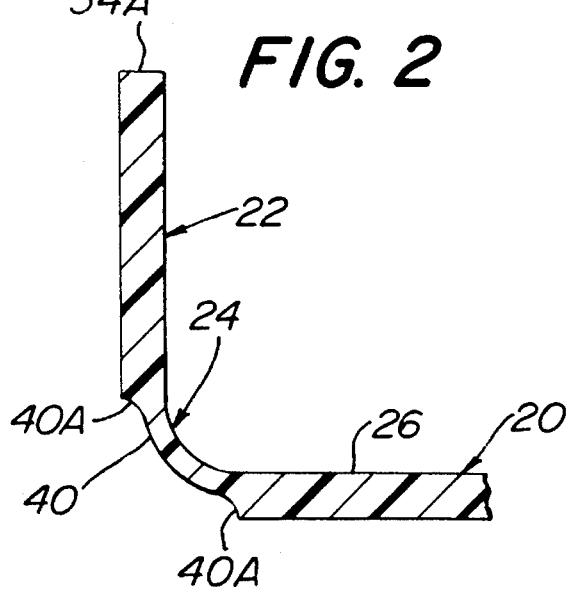
FIG. 2 is an enlarged, sectional view taken along lines 2—2 of FIG. 1.
Figure 3:
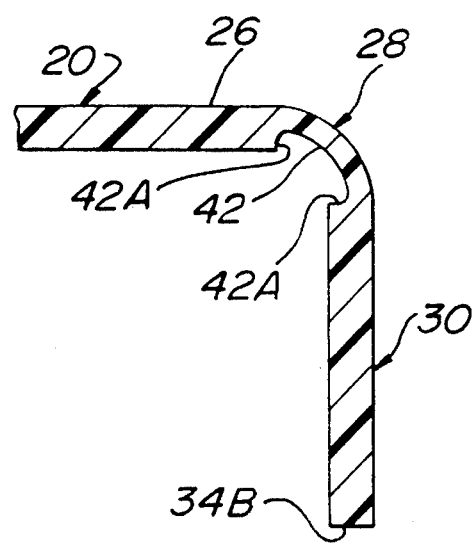
FIG. 3 is an enlarged, sectional view taken along lines 3–3 of FIG. 1.

Referring now to various figures of the drawing where like reference numerals refer to like parts there is shown at 20 in FIG. 1, an integral, i.e., one-piece, counter-top having at least one corner constructed in accordance with this invention. The counter-top is formed of a thermoplastic material selected from the group consisting of filled acrylics, filled polyesters, and filled acrylic-polyester blends, such as those sold under the various trademarks mentioned earlier.

Referring to FIGS. 1, 2, 3 and 4, it can be seen that the counter-top basically comprises a backsplash 22, an inside corner 24 (shown in detail in FIG. 2), a top surface 26, an outside corner 28 (shown in detail in FIG. 3), and a front drip edge 30. While the counter-top 20 shown in FIG. 1 is preferably formed as an integral unit, it does not have to be fabricated in this manner. Alternatively, counter-top 20 could be formed of multiple components (e.g., a separate backsplash, a separate front drip edge, a separate counter-top, an inside corner component, and an outside corner component) which are secured together. However, even in that alternative embodiment, each corner component is formed as an integral unit and is not an assembled joint of multiple pieces glued or otherwise assembled together. Similarly, in the shower stall embodiment shown in FIG. 6 and which will be described later, there are corner components, each of which is an integral unit, However, the entire shower stall is an assembled unit comprised of several parts, including plural shower walls, a shower pan, etc.

The counter-top 20 is arranged to be mounted on any supporting member so that it is disposed horizontally. In the embodiment shown in FIG. 1, the counter-top is mounted on a frame (not shown) of a conventional cabinet 32 so that the backsplash portion 22 is disposed up against a wall on which the cabinet is mounted and with the front drip edge 30 extending downward over a portion of the front of the cabinet. The counter-top 20 can be secured in place on the cabinet by any suitable means, e.g., an adhesive interposed between the underside surface of the countertop and the cabinet frame.

The formation of the inside corner 22 and outside corner 24 to form the backsplash 22 and drip edge 30, respectively, will now be described with reference to FIG. 4. To that end, a flat stock sheet 34 of any suitable filled thermoplastic material, such as those described earlier, is selected and cut to the appropriate size. The sheet 34 includes an outer surface 36 and an inner surface 38. The outer surface 36 is finished so that it gives a decorative appearance, e.g., simulates a buffed marble, or some other stone. The outer surface 36 of the sheet will ultimately form the outer surface 26 of the counter-top 20 after the countertop has been completely fabricated.

In order to form the outside corner 24, an elongated groove or slot 40 is provided in the inside or hidden surface 38 of the sheet along one side edge 34A thereof. The groove or slot 40 is spaced from the edge 34A by a distance which will represent the height of the backsplash 22 when it is completed. The groove 40 extends the entire width of the sheet 34 and may be formed by the use of a router 44 or some other means for mechanically removing material from the sheet. Alternatively, the groove may be preformed in the sheet, that is formed during the molding of the sheet itself. In any case the groove 40 includes a pair of rounded or radius corners 40A. The groove or slot 42 is formed in a similar manner to groove 40 and is located a distance from the sheet's other side edge 34B, which distance represents the height of the drip edge 30. The groove 42 also includes a pair of rounded or radius corners 42A.

In accordance with the teachings of this invention, the depth of each groove or slot 40 and 42 is selected to enable the bending therealong (as will be described later) without splitting or damage to form a tight radius bend, e.g., approximately 1 inch or less. For example, if the sheet material is CORIAN® material of a thickness of ½ inch, the grooves 40 and 42 are each made sufficiently deep, e.g., ¼ inch so that the thickness of the material under the groove is no greater than ¼ inch. This enables a bend to be made along the groove with a tight radius of curvature of approximately 1 inch. If a tighter radius of curvature is desired for the corner, the groove can be made ⅜ inch deep so that the thickness of the material under the groove is no greater than ⅛ inch. This enables the bend to have the radius of curvature of approximately ⅜ inch.

After the slots 40 and 42 have been formed either by routing or molding, the flat stock sheet is then taken to a location for heating so that it can be subsequently bent along the slots 40 and 42. The heating and bending operation can be accomplished by any suitable means, e.g., a localized heater 46. More preferably the heating can be effected by an oven (not shown) in which the whole sheet 34 is placed. In any case, the filled thermoplastic material at the slots 40 and 42 or the entire flat stock sheet 34 is heated to a temperature between 275° F. and 325° F. Thereafter the heated sheet is removed from the heater or oven and the portion of the sheet between the slot 40 and the edge 34A is grasped and bent upward in the direction of the arrow 48 (FIG. 4) with respect to the remaining portion of the sheet until it is approximately perpendicular to the remaining portion of the sheet. This action forms the backsplash 22. The outside corner and the contiguous drip edge 30 is formed in a similar manner. To that end, the portion of the sheet 34 between the slot 42 and the outside edge 34B is grasped and bent downward in the direction of arrow 50 (FIG. 4) with respect to the remaining portion of the sheet until it is approximately perpendicular to the remaining portion of the sheet.

It should be noted that the backsplash and/or drip edge corners may be less than or greater than 90°, if desired, in the interest of aesthetics or to conform to the shape of the area in which the countertop 20 is to be located. In any case, once the corners are formed, the countertop is allowed to cool so that the heated material hardens, thereby making the corners permanent. The countertop is now ready for installation on the cabinet.

Figure 4:
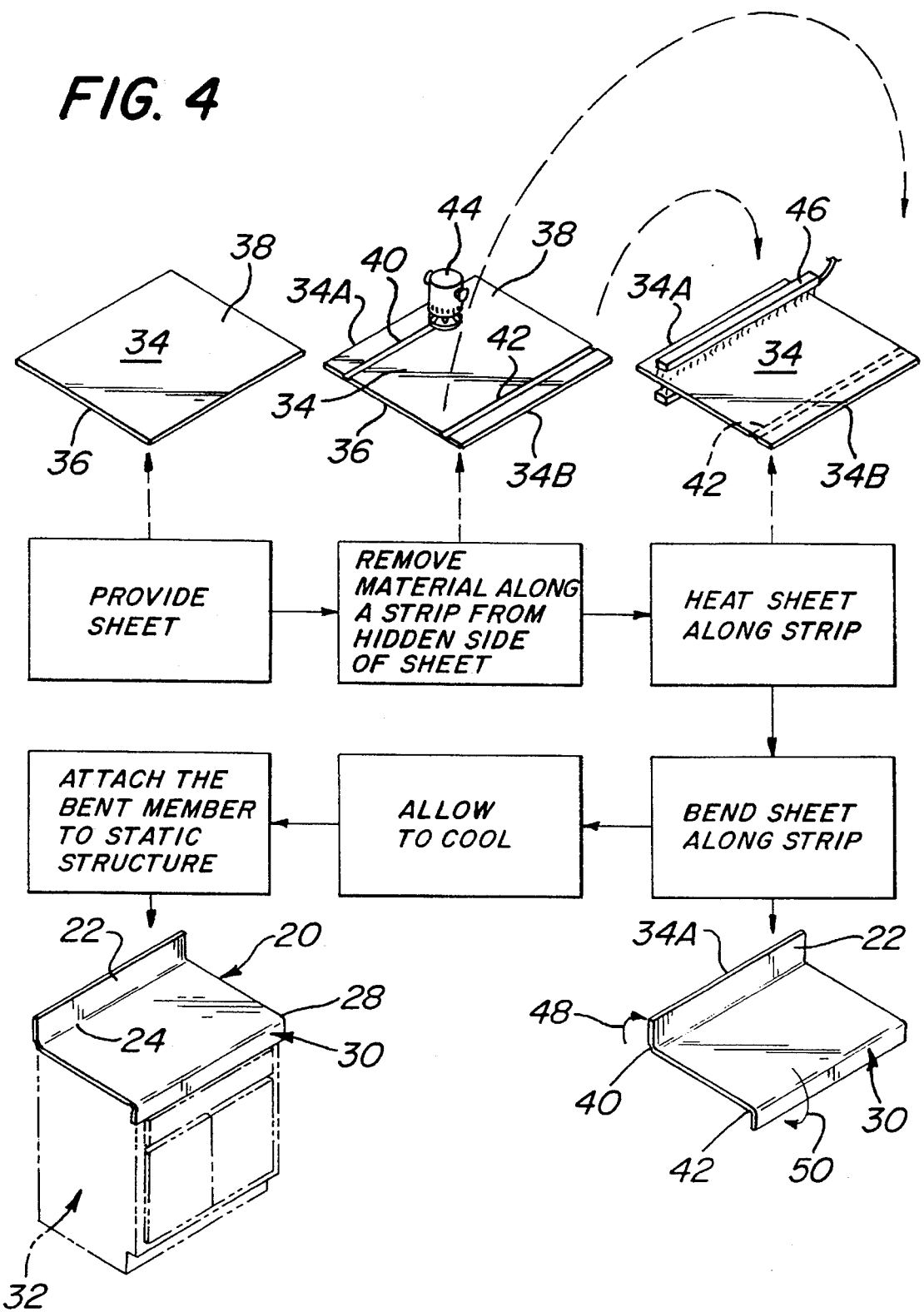
FIG. 4 is an illustration and flow diagram depicting the fabrication steps for forming the counter-top of FIG. 1 and other components constructed in accordance with this invention.

It should be pointed out at this juncture that the countertop 20 and the method of making the same as illustrated in FIG. 4 is merely exemplary. Thus, it should be understood that the countertop does not have to include a backsplash 22 and a front drip edge 30. Therefore, depending on the construction, the countertop can be fabricated in accordance with this invention to include either a backsplash 22 or a front drip edge 30. Moreover, it should be pointed out that instead of making the entire countertop as an integral unit, the inside corner 24 may itself be a corner component constructed in accordance with this invention and adhesively secured to a planar backsplash strip and to a planar countertop to form a countertop with a backsplash. The outside corner 28 may be made in a similar manner to produce an outside corner component which can be adhesively secured to a planar drip edge strip and to a planar countertop to form a countertop with a drip edge. The corner components utilized in such alternative constructions can be formed in a manner to be described with respect to corner components forming portions of the stall shower shown in FIG. 5.

Figure 5:
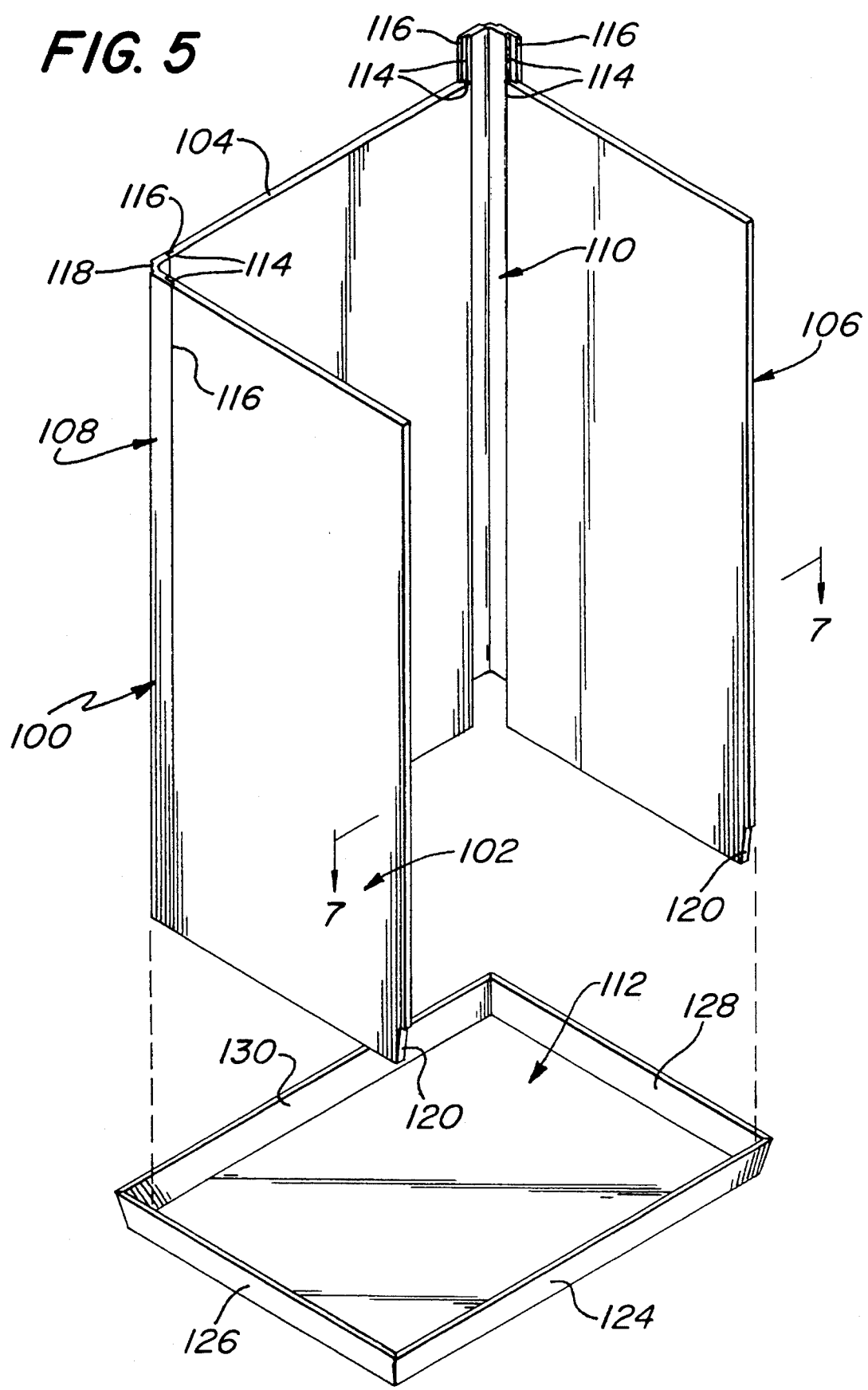
FIG. 5 is an exploded isometric view of an alternative embodiment of this invention, which is a stall shower including a plurality of corner sections and a pan constructed in accordance with this invention.

Referring now to FIG. 5, there is shown a stall shower 100 including corner components and a shower pan constructed in accordance with this invention. In particular, the shower 100 includes three wall panels 102, 104, and 106, two inside corner components 108 and 110, and a floor pan 112. The wall panels 102, 104, and 106, are each planar sheets formed of a filled thermoplastic material, such as that used to form the countertop 20. The panels 102 and 104 are joined at right angles to each other by an inside corner component 108 and an adhesive. In a similar manner the wall panels 104 and 106 are joined together by the inside corner component 110 and an adhesive.

The specifics of the inside corner components 108 and 110 and the manner in which these components are used to secure the wall panels together will be described later. The floor pan 112, whose structural features and manner of fabrication will also be described later, is adhesively secured to the wall panels and the corner component to complete the assembly of the stall shower and to render it watertight.

The corner components 108 and 110 are of identical construction. Thus, as can be seen in FIGS. 5 and 7, each component is a flanged member whose inside surface is decorative, e.g., simulates marble. A recess or ledge 114 is provided along each side edge 116 of the component on the inner surface thereof. These recesses are arranged to mate with correspondingly shaped recesses in the wall panels to secure the corner members to the wall panels, as will be described later. Each of the corner components 108 and 110, is formed from a strip of filled thermoplastic material, like that forming the countertop, but whose edges 116 have been machined (e.g., routed) or molded to include the heretofore identified ledges 114. A groove or slot 118 is provided along the length of each corner member on the hidden surface (i.e., the non-decorative surface) in the same manner as described heretofore with reference to the formation of the slots 40 and 42 in the countertop, except that the slot 118 is centered between the two side edges 116 of the corner member. The material at the slot is then heated in a similar manner as described heretofore and then the two side edge portions are bent towards each other until their decorative surfaces are displaced 90° from each other to complete the inside corner. The corner is then allowed to cool and set.

It should be pointed out at this juncture an outside corner component can be formed in a similar manner by bending the two side edge portions away from each until their decorative surfaces are displaced 270° from each other.

The side panel 102 includes a recess or ledge 114 corresponding in size and shape to the ledge 114 in the corner member 108. The ledge 114 of the side panel 102 is arranged to be disposed on the ledge 114 or the corner member and adhesively secured thereto to secure the wall panel 102 to the corner panel 108. The wall panel 104 includes a pair of recesses or ledges 114 in each of its side edges. Each recess corresponds in size and shape to the ledges 114 in the corner members 108 and 110. The ledge 114 in one edge of the wall panel 104 is arranged to be disposed and adhesively secured on the other ledge 114 of the corner member 108 to secure that wall panel to the corner member 108. The other side of the wall panel is secured to the other corner member in a similar manner. The side wall panel 106 is constructed similarly to the side wall panel 102 and is secured to the corner member 110 in a similar manner that the wall panel 102 is secured to the corner member 108.

As can be seen in FIG. 5, the lower front edge of each of the side wall panels 102 and 106 includes an angled recess 120 therein. The recesses 120 are arranged to abut and be adhesively secured to a front wall portion (to be described later) of the shower pan 112.

The details of the shower pan 112 and its manner of fabrication will now be described. As can be seen in FIG. 5, the pan 112 basically comprises a base or bottom wall 122, a front wall 124, a rear wall 126, and a pair of side walls 128 and 130. The front, rear, and side walls are all planar members which project up from the base wall at an obtuse angle so that they flair outward.

In accordance with the preferred embodiment of this invention, the pan 112 is formed as an integral unit from a single planar sheet 132 of a filled thermoplastic material, such as the material forming the walls and corner members. To that end, a rectangular sheet 132 of such material is provided and is cut or machined to form a generally V-shaped notch 134 in each of its corners as shown in FIG. 6. The sheet or panel 132 can alternatively be premolded in the overall shape shown in FIG. 6.

The length of each side of the V-shaped notch 134 is identical and defines the height of the front wall, side wall and rear wall of the pan. A rectangular groove or slot 136 is provided in the under side (non-decorative) surface of the panel 132 so that the corners of the slot are contiguous with the apices of the V-shaped corners 134. The groove or slot 136 can be formed by either routing or premolding it in the same manner as described with reference to the slots 40, 42 and 118.

The sheet 132 is then heated along its slot 136 in a similar manner to that described heretofore. Then each of the edge portions between the V-shaped notches is bent upward along the length of the contiguous slot 136, until the sides of each V-notch abut, whereupon each edge portion of the sheet will extend at the same obtuse angle to the central portion of the sheet. This action forms the front wall, side wall and back wall. An adhesive can then be applied to the abutting notch edges to complete the fabrication of the pan 112 and to render it waterproof.

The walls 102, 104, and 106 and corner members 108 and 110 are arranged to be adhesively secured to the pan 112 along their lower edges to complete the assembly of the stall shower, with the recesses 120 in the walls 102 and 106 abutting the inner surface of the pan's front wall 124.

As should be appreciated from the foregoing, various structural components having either tight radius inside or outside corners can be made quickly and easily in accordance with the teachings of this invention. Moreover, such corners, being integral, have increased aesthetic appeal over assembled or jointed corners.

Without further elaboration the foregoing will so fully illustrate my invention that others may, by applying current or future knowledge, adapt the same for use under various conditions of service.

I claim:

1. A method of forming a component for fixed securement to the interior of a static structure to provide a decorative surface, said method comprising the steps of:

(a) providing a molded unitary, non-laminated generally planar panel of a predetermined thickness of at least ¼ inch (0.64 cm) having an inner and an outer surface, said panel being molded of a filled thermoplastic material selected from the group consisting of filled acrylics, filled polyesters, and filled acrylic-polyester blends to form a homogeneous body, said panel having a radius-cornered recess in one of said surfaces extending along a first predetermined line, whereupon the thickness of said panel along said first line is substantially less than the thickness of contiguous portions of said panel;

(b) heating said panel along said first line; and (c) bending said panel along said first line at said recess to form a corner thereat, with a radius of curvature of said corner being no greater than 1 inch (2.54 cm) and without said corner being damaged.

2. The method of claim 1 wherein said material is removed along said first line from said inner surface to form an outer corner.

3. The method of claim 1 wherein said material is removed along said first line from said outer surface to form an inner corner.

4. The method of claim 1 additionally comprising the steps of removing a portion of the material forming said panel along a second predetermined line from the other of said surfaces, whereupon the thickness of said panel along said second line is substantially less than the thickness of contiguous portions of said panel, heating said panel along said second line, and bending said panel along said second line to form a corner thereat.

5. The method of claim 2 wherein said method comprises making a counter-top, said counter-top having at least said outer corner.

6. The method of claim 3 wherein said method comprises making a counter-top, said counter-top having at least said inner corner.

7. The method of claim 4 wherein said method comprises making a counter-top, said counter-top having at least said outer corner and said inner corner.

8. The method of claim 2 wherein said method comprises making an outer corner molding for a stall shower, said molding having at least said outer corner.

9. The method of claim 3 wherein said method comprises making an inner corner molding for a stall shower, said molding having at least said inner corner.

10. The method of claim 1 wherein said recess is formed by mechanically removing material from said one of said surfaces.

11. The method of claim 1 wherein said recess is formed during the molding said planar panel.

12. The method of claim 11 wherein said recess is formed by mechanically removing material of said panel after the molding thereof.

* * * * *